United States Patent [19]
Goto et al.

[11] Patent Number: 5,493,324
[45] Date of Patent: Feb. 20, 1996

[54] IMAGE FORMING APPARATUS

[75] Inventors: Hiroshi Goto, Itami; Tateki Oka, Atsugi, both of Japan

[73] Assignee: Minolta Camera Kabushiki Kaisha, Osaka, Japan

[21] Appl. No.: 84,474

[22] Filed: Jul. 1, 1993

[30]     Foreign Application Priority Data

Jul. 3, 1992  [JP]  Japan .................................. 4-176783
Jul. 3, 1992  [JP]  Japan .................................. 4-176784

[51] Int. Cl.$^6$ ...................................................... H04L 1/21
[52] U.S. Cl. ......................... 347/252; 258/296; 347/247
[58] Field of Search ...................... 346/108, 1.1, 107 R, 346/76 L, 160; 358/298, 296, 300, 302; 347/252, 251, 253, 240, 131, 132, 247, 237

[56]          References Cited

U.S. PATENT DOCUMENTS 4,194,221  12/1978  Stoffel ..................................... 358/456
4,387,983   6/1983  Masegi .
4,544,922  10/1985  Watanabe et al. .
4,847,641   7/1989  Tung .
4,878,068  10/1989  Suzuki ..................................... 346/108

*Primary Examiner*—Mark J. Reinhart
*Attorney, Agent, or Firm*—Burns, Doane, Swecker & Mathis

[57]            ABSTRACT

An image forming apparatus comprising: a laser beam irradiating device for irradiating a laser beam onto a record support member; a storage device for storing image data composed of a plurality of dots; a detection device which reads out the image data from the storage device so as to detect whether or not dots to be subjected to light emission by the laser beam are arranged continuously; and a control device for controlling an irradiation period of the laser beam irradiating device to a smaller value when the detection device has detected that the dots to be subjected to light emission are arranged continuously.

8 Claims, 21 Drawing Sheets

Dxy = 0 : Nonprinting pixel
Dxy = 1 : Printing pixel $1 \leq x \leq xmax$ \} Data region
$1 \leq y \leq ymax$

| 0 | 0 | 0 |
|---|---|---|
| 0 | 1 | 0 |
| 0 | 0 | 0 |

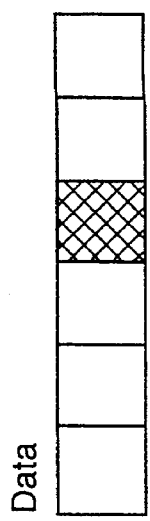
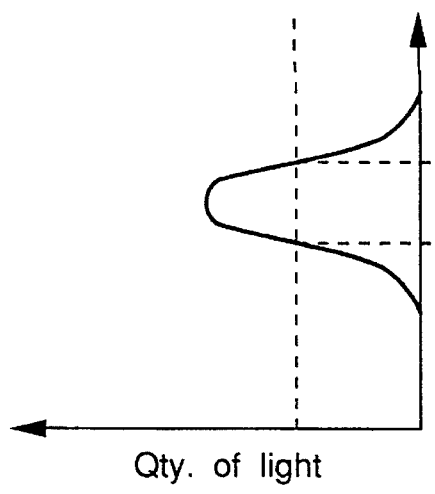
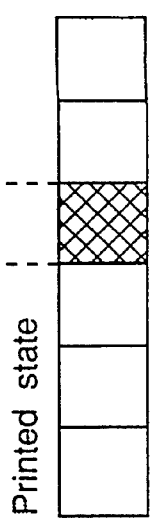
Fig.6(A)
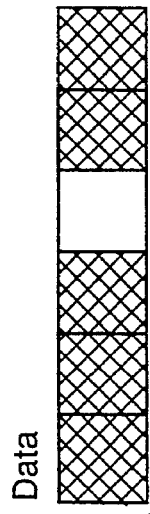
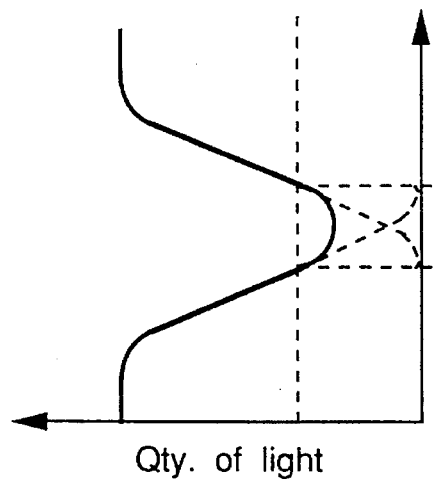
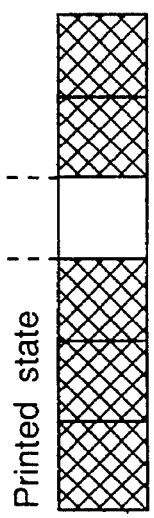
Fig.6(B)
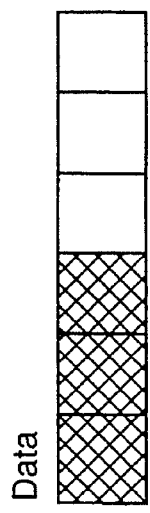
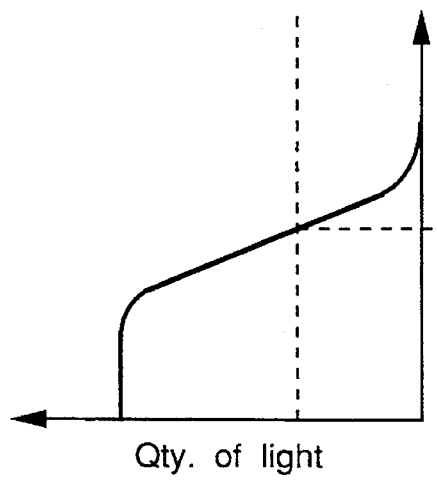
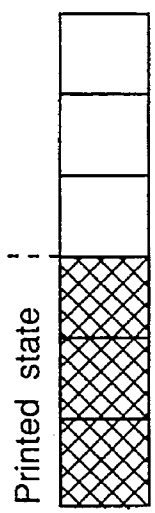
Fig.6(C)

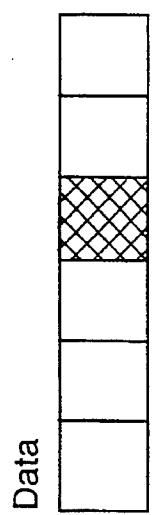 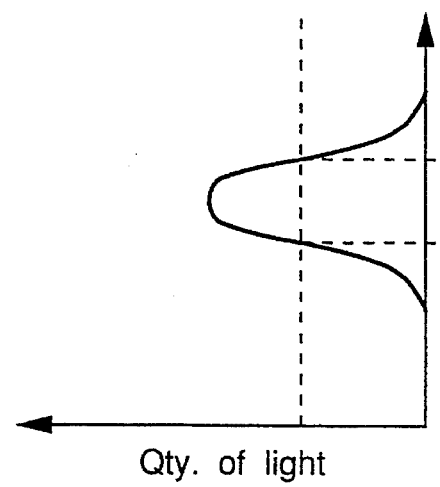 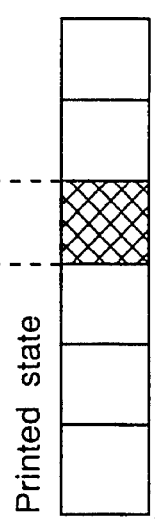
Fig.21(C) PRIOR ART
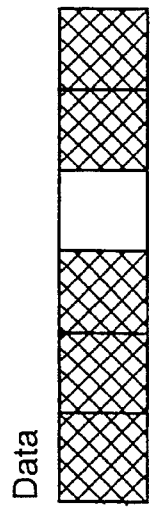 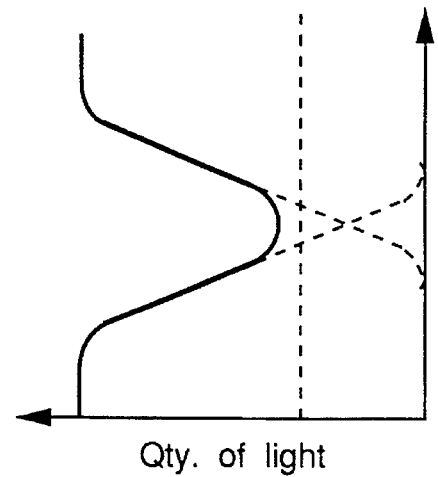 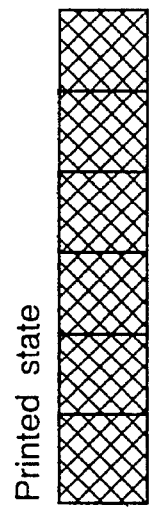
Fig.21(B) PRIOR ART
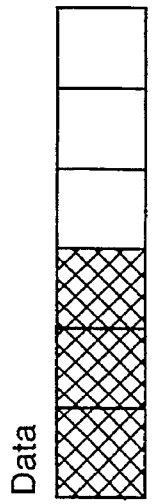 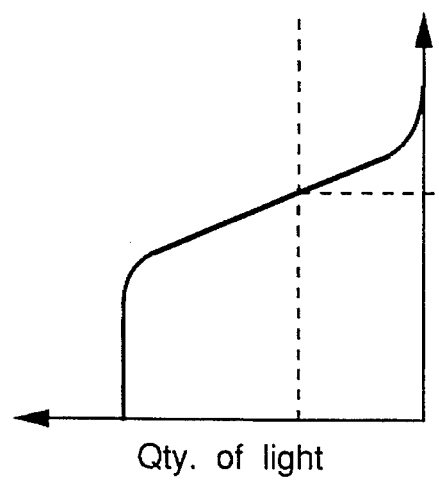 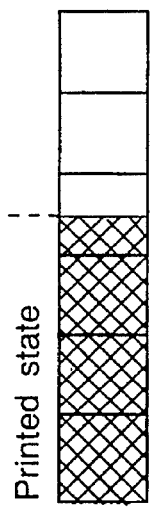
Fig.21(A) PRIOR ART

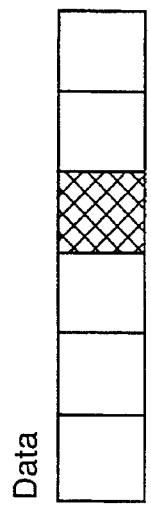 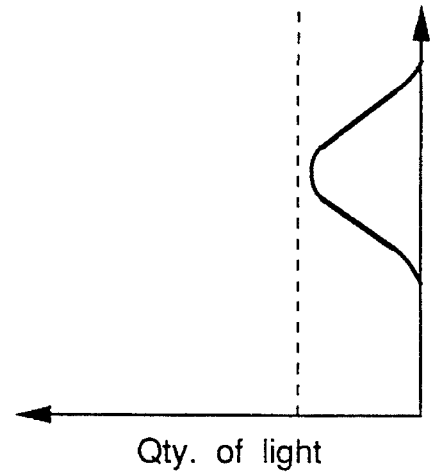 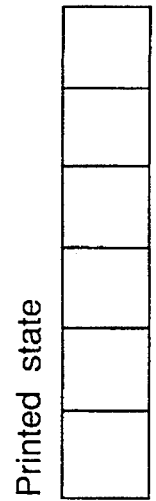
Fig.22(C) PRIOR ART
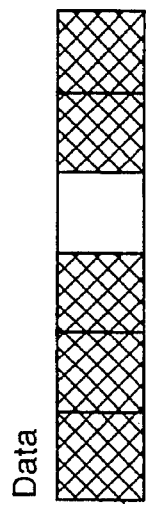 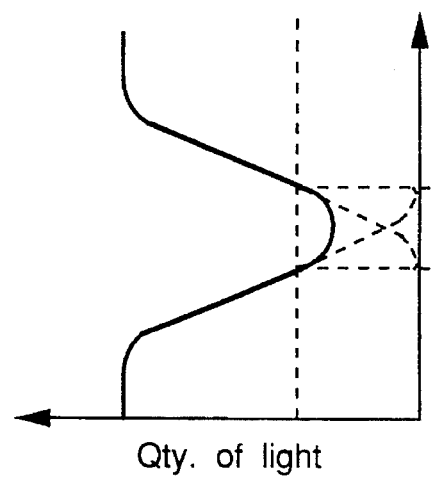 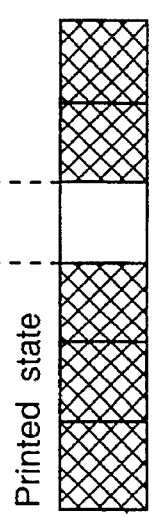
Fig.22(B) PRIOR ART
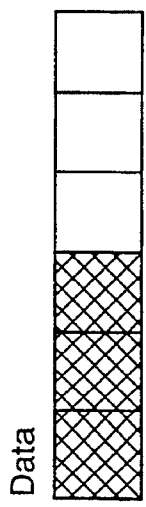 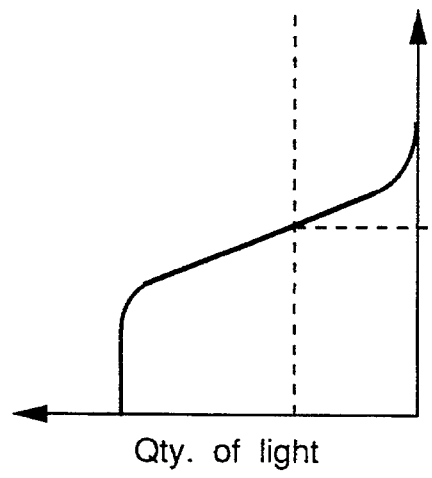 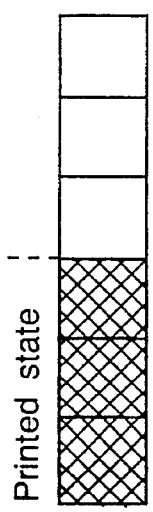
Fig.22(A) PRIOR ART

IMAGE FORMING APPARATUS

BACKGROUND OF THE INVENTION

The present invention relates to an exposure control device which enables both each independent black dot and each independent white dot on a face to be printed securely when an image is formed by using a laser beam.

In response to a demand for image quality of higher fineness, a printer employing a laser diode has come into use recently.

FIG. 18 shows one example of an image forming portion of this known printer. In the known printer of a type shown in FIG. 18, a thin film member 11 having a peripheral length slightly larger than an outer peripheral length of a developing roller 10 is mounted around an outer periphery of the developing roller 10 such that higher image quality is secured. A photosensitive drum 15 is adapted to be rotated in the direction of the arrow shown in FIG. 18 and a surface of the photosensitive drum 15 is uniformly charged to a predetermined potential by a corona charger 16. When a position on the photosensitive drum 15 has been rotated through a predetermined amount after this charging of the surface of the photosensitive drum 15, a laser beam is irradiated at various positions on the photosensitive drum 15 based on image data and thus, an electrostatic latent image is formed on the photosensitive drum 15. Subsequently, when the photosensitive drum 15 has been further rotated, toner transported by the thin film member 11 is adsorbed to a low potential portion of the photosensitive drum 15, i.e. a portion on which the laser beam has been irradiated so as to develop the electrostatic latent image into a visible toner image. Thereafter, when the visible toner image has reached a transfer position, the toner image is transferred onto a recording paper sheet 17 by a transfer charger 16 and then, the transferred image is fixed to the recording paper sheet 17 by a fixing device (not shown).

The light emitting state of the above laser beam is controlled as shown in the flow chart of FIG. 19. Initially, a portion (not shown) for controlling the light emitting state of the laser beam reads out image data of one pixel at step S1 and judges at step S2 whether or not the image data is a printing pixel, i.e. a pixel for which a toner image should be formed. In case the read-out pixel is the printing pixel at step S2, a light emitting duty ratio is set to "1" at step S3 as shown in FIG. 20 such that the laser beam is emitted at a predetermined quantity of light during a period corresponding to a width of one pixel. On the contrary, if the read-out pixel is not the printing pixel at step S2, the light emitting duty ratio is set to "0" at step S4 as shown in FIG. 20 such that irradiation of the laser beam is not performed. Then, based on the light emitting duty ratio set at step S3 or S4, the laser beam is emitted so as to perform exposure of the photosensitive drum 15 at step S5. After exposure of the photosensitive drum 15 has been performed, the program flow returns to step S1 at step S6 such that the same processings as described above are performed for the next pixel. The foregoing processings are sequentially performed for all given image data so as to form an image on the printing paper sheet 17, whereby printing is completed.

However, the known printer operated as described above has such a drawback that since emission and nonemission of the laser beam are controlled merely by presence and absence of the image data, it is difficult to print with fidelity both each white dot and each black dot existing independently of one another.

For example, when only one dot is black data in image data of six dots as shown in FIG. 21(C), the quantity of light of the laser is controlled such that the one dot is printed as black with fidelity. In this case, even if three dots should be continuously printed as black in image data of six dots as shown in FIG. 21(A), a printed state is obtained in which an area larger than the three dots becomes black. Meanwhile, even if only one dot should not be independently printed as black in image data of six dots as shown in FIG. 21(B), all the six dots are printed as black.

As will be seen from the distribution of quantity of light shown in FIGS. 21(A) to 21(C), the above mentioned printed states result from the fact that when a light beam approximate to Gaussian distribution is scanned, leaked light of the light beam is slightly irradiated also on an area of nonprinting pixels at an edge portion of an image. In case this leaked light exceeds an illustrated threshold quantity of light, the pixel is printed as black. Therefore, when the light beam exceeding the threshold quantity of light has been irradiated to form dots, the dots are printed as black as shown in FIGS. 21(A) and 21(B) even if the dots are nonprinting image data as shown.

If this leaked light is restrained to such a extent that one independent white dot can be reproduced as shown in FIGS. 22(A) and 22(B), the problem referred to above should be solved. However, on the other hand, if one independent black dot should be printed as shown in FIG. 22(C), the quantity of light of the laser beam does not reach the threshold value or more and thus, such an opposite problem arises that one black dot cannot be printed.

SUMMARY OF THE INVENTION

Accordingly, an essential object of the present invention is to provide, with a view to eliminating the above mentioned inconveniences inherent in conventional exposure control devices, an exposure control device which enables printing of each independent white dot and printing of each independent black dot to be performed with fidelity for given image data.

In order to accomplish this object of the present invention, an image forming apparatus according to a first embodiment of the present invention comprises: a laser beam irradiating means for irradiating a laser beam onto a record support member; a storage means for storing image data composed of a plurality of dots; a decision means which reads out the image data from said storage means so as to decide whether dots to be subjected to light emission by the laser beam are independent or are arranged continuously; and a control means for controlling the luminous intensity of said laser beam irradiating means in accordance with a decision of said decision means.

The storage means stores the image data used for image forming. The decision means reads out the image data stored in the storage means and decides whether the dots to be subjected to light emission by the laser beam are independent or are arranged continuously. When the dots to be subjected to light emission are independent, the control means increases the luminous intensity of the laser beam irradiating means. On the contrary, when the dots to be subjected to light emission are arranged continuously, the control means reduces the luminous intensity of the laser beam irradiating means.

Accordingly, since the luminous intensity of the laser beam irradiating means is adjusted in accordance with whether the dots to be subjected to light emission by the laser beam are independent or are arranged continuously in the image data read out from the storage means, it becomes possible to print both one independent white dot and one independent black dot with fidelity for the image data.

Meanwhile, to this end, an image forming apparatus according to a second embodiment of the present invention comprises: a laser beam irradiating means for irradiating a laser beam onto a record support member; a storage means for storing image data composed of a plurality of dots; a detection means which reads out the image data from said storage means so as to detect whether or not dots to be subjected to light emission by the laser beam are arranged continuously; and a control means for reducing an irradiation period of said laser beam irradiating means when said detection means has detected that the dots to be subjected to light emission are arranged continuously.

In this embodiment, since the irradiation period of the laser beam irradiating means is controlled in accordance with whether or not the dots to be subjected to light emission by the laser beam are arranged continuously in the image data read out from the storage means, it also becomes possible to print both one independent white dot and one independent black dot with fidelity for the image data.

BRIEF DESCRIPTION OF THE DRAWINGS

This object and features of the present invention will become apparent from the following description taken in conjunction with the preferred embodiments thereof with reference to the accompanying drawings, in which:

FIGS. 6(A), 6(B) and 6(C) are views showing printed states obtained by the flow chart of FIG. 4;

FIGS. 21(A), 21(B) and 21(C) are views indicative of a drawback of the prior art printer of FIG. 18 (already referred to); and FIGS. 22(A), 22(B) and 22(C) are views indicative of another drawback of the prior art printer of FIG. 18 (already referred to).

Before the description of the present invention proceeds, it is to be noted that like parts are designated by like reference numerals throughout several views of the accompanying drawings.

DETAILED DESCRIPTION OF THE INVENTION

Figure 1:
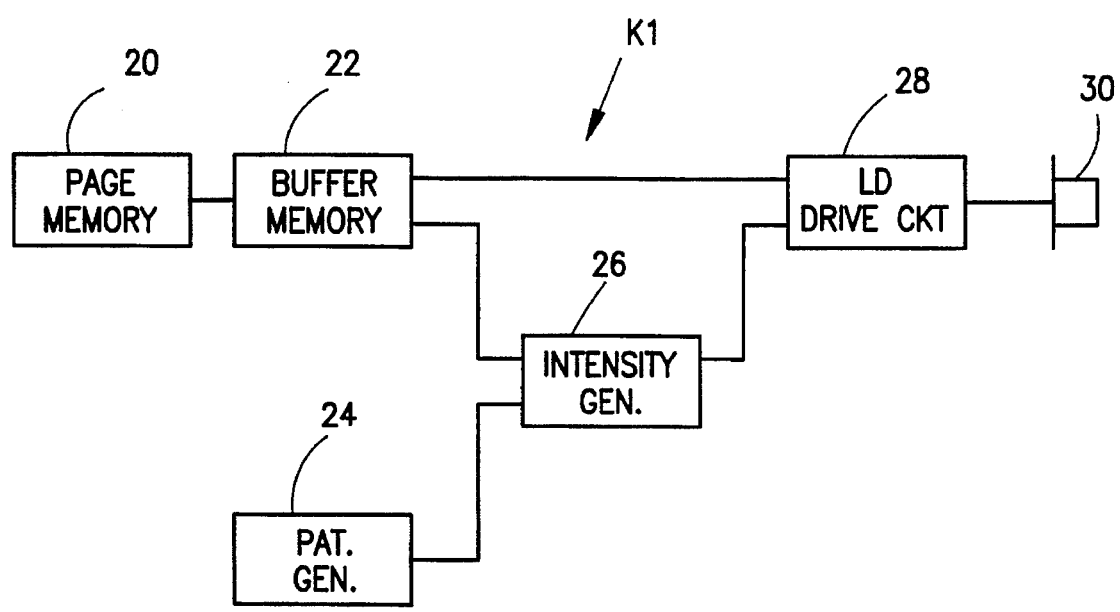
FIG. 1 is a block diagram showing a general construction of an exposure control device according to a first embodiment of the present invention.
Figures 2, 3:
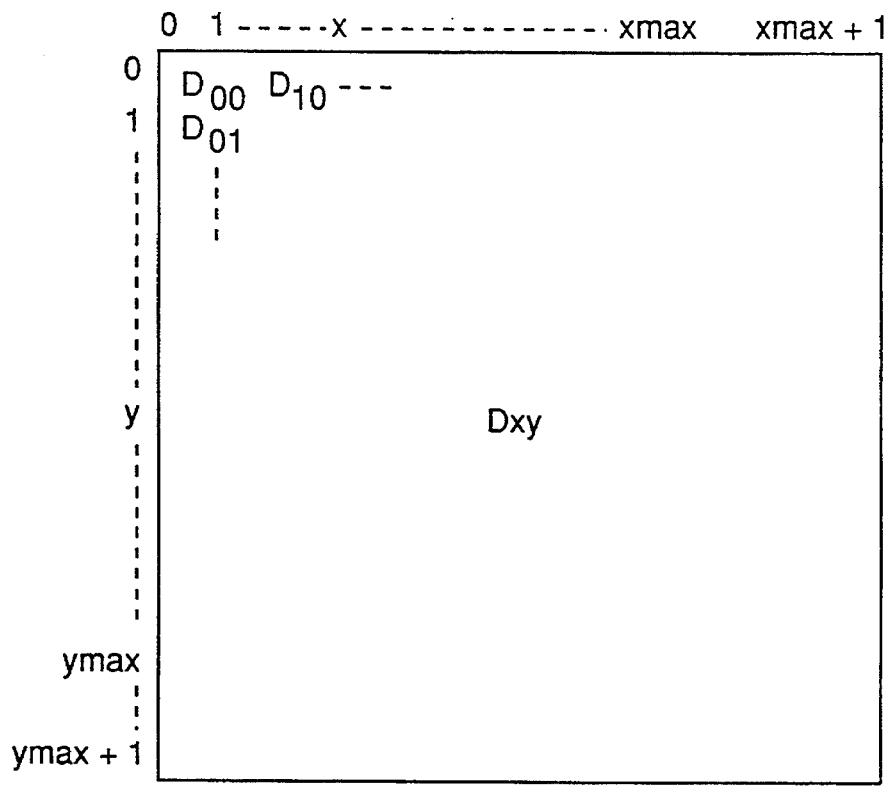
FIG. 2 is a view showing one example of image data stored in a page memory of the exposure control device of FIG. 1.
FIG. 3 is a view showing one example of a pattern outputted from a pattern generator of the exposure control device of FIG. 1.

Referring now to the drawings, there is shown in FIG. 1, an exposure control device K1 according to a first embodiment of the present invention. The exposure control device K1 includes a page memory 20, a buffer memory 22, a pattern generator 24, an intensity generator 26, an LD drive circuit 28 and a laser diode (LD) 30. As shown in FIG. 2, the page memory 20 is provided for storing one page of image data to be recorded on a recording paper sheet acting as a recording medium and constitutes an image data storage. The buffer memory 22 acts also as the image data storage and has a capacity for storing 3 lines of the image data stored in the page memory 20 so as to update and store a total of 3 lines, i.e. a line to be printed and two lines disposed forwards and rearwards of the line.

The pattern generator 24 stores a predetermined pattern of a 3×3 matrix composed of a pixel to be printed and pixels surrounding the pixel and outputs to the intensity generator 26 connected to the pattern generator 24, data corresponding to the pattern stored in the pattern generator 24. The predetermined pattern is arranged to detect one independent black or white dot and one concrete example of the predetermined pattern is shown in FIG. 3.

The intensity generator 26 reads out from the buffer memory 22, image data of the pixel to be printed and data of the pixels surrounding the pixel and judges whether or not the read-out data coincides with the predetermined pattern supplied from the pattern generator 24 so as to output, as a luminous intensity signal, a result of this judgement to the subsequent LD drive circuit 28. The pattern generator 24 and the intensity generator 26 function as a detection means.

The LD drive circuit 28 functions as a light emission control means. The image data to be printed is sequentially supplied to the LD drive circuit 28 from the buffer memory 22 and the LD drive circuit 28 performs, based on the image data, on-off control of the LD 30 acting as a laser beam output means. At this time, luminous intensity (LD drive current) is controlled based on the luminous intensity signal outputted from the intensity generator 26.

Figure 4:
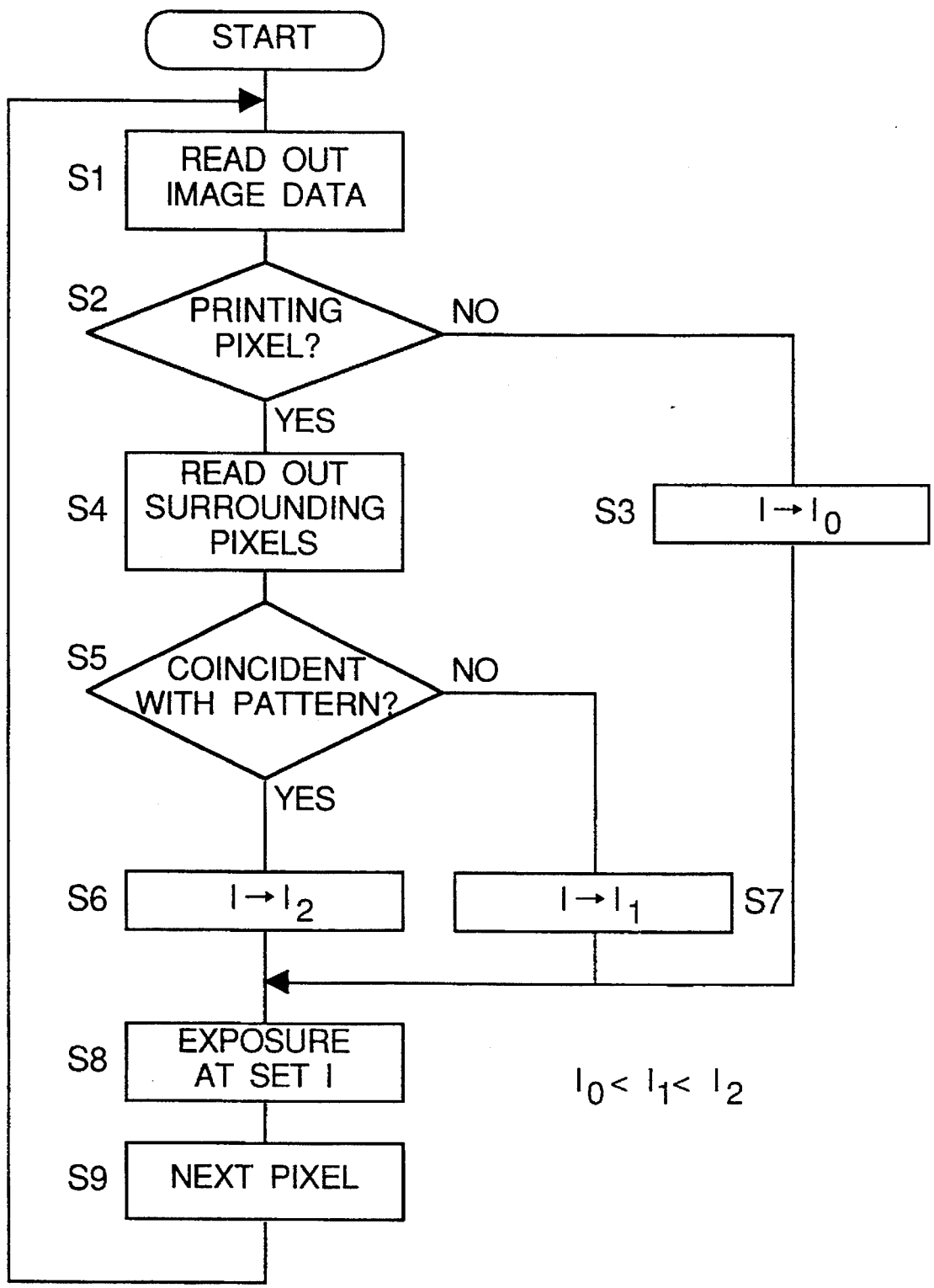
FIG. 4 is a flow chart showing operations of the exposure control device of FIG. 1.

The exposure control device K1 of the above described arrangement is operated as follows in accordance with the flow chart of FIG. 4. Meanwhile, this flow chart does not show processing sequences of the exposure control device K1 but shows rough operations of the exposure control device K1. The image data stored in the page memory 20 as shown in FIG. 2 is stored, by 3 lines, in the buffer memory 22. At step S1, the intensity generator 26 reads out the image data of the pixel to be printed, which is stored in the buffer memory 22. Then, at step S2, the intensity generator 26 judges whether or not the read-out image data is data to printed. When the read-out image data is the nonprinting data, i.e. a nonprinting pixel, a signal for setting an LD drive current I to a value $I_0$ of zero, in other words, a signal for preventing light emission of the LD 30 is outputted as the luminous intensity signal at step S3.

Figure 5:
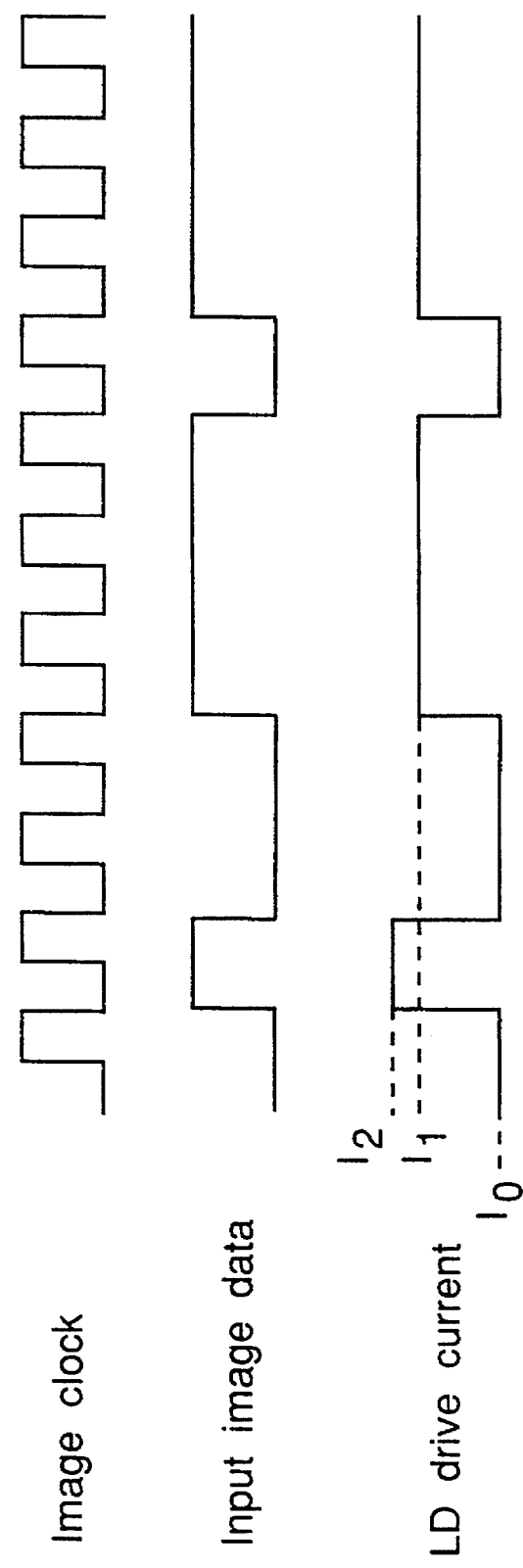
FIG. 5 is a timing chart showing light emitting state of a laser diode operated by the flow chart of FIG. 4.

On the other hand, when the read-out image data is data to be printed, i.e. a printing pixel, the data of the pixels surrounding the pixel is also read out by the intensity generator 26 at step S4. Then, at step S5, the intensity generator 26 judges whether or not the image data of these pixels coincides with the predetermined pattern supplied from the pattern generator 24. In the case of "YES" at step S5, the pixel to be printed is one independent dot and thus, at step S6, the intensity generator 26 outputs, as the luminous intensity signal, a signal for setting the LD drive current I to a predetermined value $I_2$ for full light emission of the LD 30. On the other hand, in the case of "NO" at step S5, the pixel to be printed is not one independent dot and thus, at step S7, the intensity generator 26 outputs, as the luminous intensity signal, a signal for setting the LD drive current I to a value $I_1$ smaller than the value $I_2$ as shown in FIG. 5. Subsequently, at step S8, the LD drive circuit 28 effects light emission of the LD 30 on the basis of the luminous intensity signal outputted from the intensity generator 26.

Namely, when the luminous intensity signal for setting the LD drive current I to the value $I_0$ has been outputted, the input image data is in the LOW state as shown in the timing chart of FIG. 5. At this time, light emission of the LD 30 is not performed at all. Meanwhile, when the luminous intensity signal for setting the LD drive current I to the value $I_2$ has been outputted, the input image data is in the HIGH state as shown in FIG. 5. At this time, full light emission of the LD 30 is performed. Furthermore, when the luminous intensity signal for setting the LD drive current I to the value $I_1$ has been outputted, light emission of the LD 30 is performed at a luminous intensity lower than that of the value $I_2$ for full light emission as shown in FIG. 5. Thereafter, the same processings as described above are performed for the next pixel at step S9.

Thus, by controlling luminous intensity of the LD 30 on the basis of whether or not the pixel to be printed is one independent dot, printed states having fidelity for data can be achieved as shown in FIGS. 6(A) to 6(C). Namely, when the data shown in FIG. 6(A) has been inputted, light emission of the LD 30 is performed at a luminous intensity lower than that of full light emission, quantity of leaked light to the neighboring nonprinting area is reduced to a threshold value or less. As a result, the printed state has fidelity for the data as shown in FIG. 6(A). Meanwhile, also when the data includes nonprinting data of one independent dot as shown in FIG. 6(B), luminous intensity of the LD 30 is restrained in the same manner as in FIG. 6(A), so that quantity of leaked light to the nonprinting area of the one independent dot is not more than the threshold value and thus, the printed state has fidelity for the data as shown in FIG. 6(B).

Furthermore, when the data includes printing data of one independent dot as shown in FIG. 6(C), full light emission of the LD 30 is performed. Hence, quantity of light exceeding the threshold value is obtained at the dot. Therefore, also in case the data includes the printing data of one independent dot, the printed state having fidelity for the data can be obtained.

Meanwhile, in this embodiment, it is needless to say that the predetermined pattern set in the pattern generator 24 is not limited to the one described above and a plurality of patterns may be set in the pattern generator 24. For example, without regarding only the data of one dot existing completely independently as being independent in contrast with the described pattern, such a pattern may be employed that the pixel to be printed is regarded as being independent even in the case where data exists in an oblique direction of the pixel to be printed. Furthermore, setting of the LD drive current for control of luminous intensity is not restricted to the one described above. For example, the LD drive current may be set to a plurality of values in accordance with kinds of the recording media in use or such a method may be employed in which the LD drive current set in accordance with the coincident pattern is changed.

Figure 7:
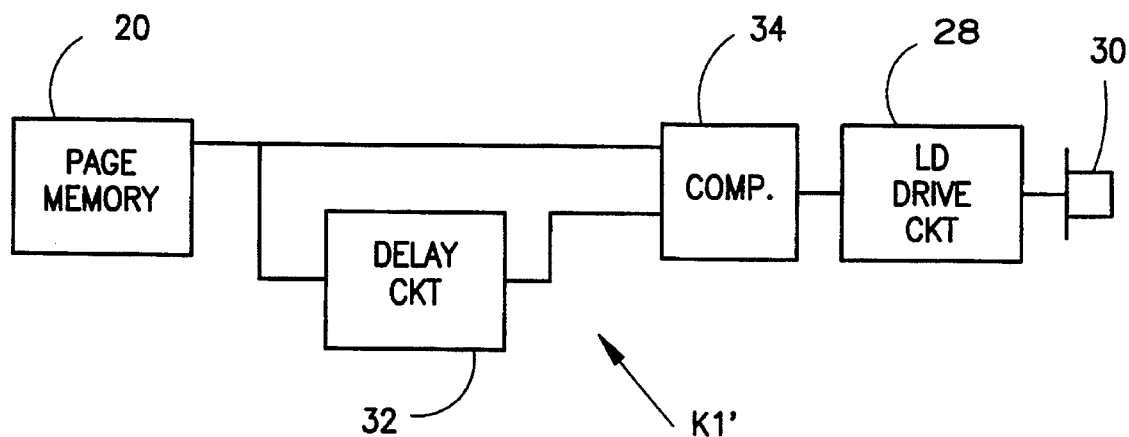
FIG. 7 is a block diagram showing a general construction of an exposure control device which is a modification of the exposure control device of FIG. 1.

FIG. 7 shows an exposure control device K1' which is a modification of the exposure control device K1. In the exposure control device K1', a delay circuit 32 and a comparator 34 are provided between the page memory 20 and the LD drive circuit 28 in place of the buffer memory 22, the pattern generator 24 and the intensity generator 26 of the exposure control device K1.

In the above described arrangement of the exposure control device K1', the delay circuit 32 has a function of reading out image data D1 of a pixel to be printed from the page memory 20 and outputting preceding image data D0 obtained by imparting a delay of one dot to the image data D1. Meanwhile, the comparator 34 functions to compare the image data D1 read out from the page memory 20 with the image data D0 outputted from the delay circuit 32. The comparator 34 further has a function of supplying to the LD drive circuit 28, a luminous intensity signal (analog signal) corresponding to a result of the comparison. The delay circuit 32 and the comparator 34 are arranged to directly read out the image data one pixel by one pixel in the sequence of the data of each pixel. Meanwhile, the LD drive circuit 28 is arranged to effect light emission of the LD 30 in accordance with the luminous intensity signal outputted from the comparator 34.

Figure 8:
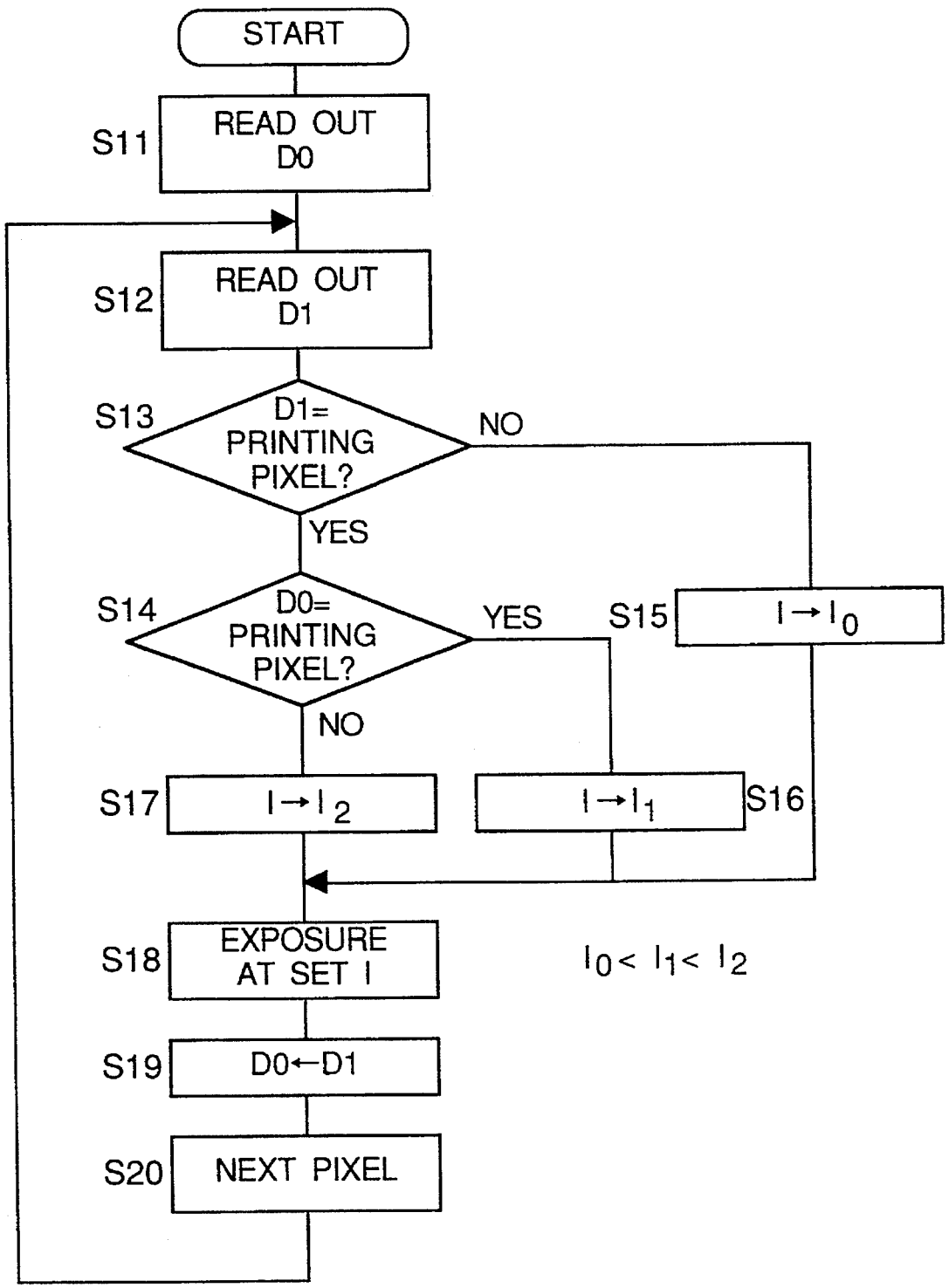
FIG. 8 is a flow chart showing operations of the exposure control device of FIG. 7.

The exposure control device K1' of the above described arrangement is operated based on the flow chart of FIG. 8. Initially, at step S11, the comparator 34 reads out from the delay circuit 32, the preceding image data D0 having a delay of one dot for the image data D1 of the pixel to be printed and stores the preceding image data D0. Meanwhile, at step S12, the comparator 34 reads out from the page memory 20, the current image data D1 of the pixel to be printed. Subsequently, it is judged at step S13 whether or not the image data D1 is a printing pixel and then, it is judged at step S14 whether or not the image data D0 is a printing pixel. In the case of "NO" at step S13, printing is not required to be performed and thus, at step S15, the comparator 34 outputs the luminous intensity signal for setting the LD drive current I to the value $I_0$. Meanwhile, in the case of "YES" at steps S13 and S14, namely when printing pixels are arranged continuously, the comparator 34 outputs the luminous intensity signal for setting the LD drive current I to the value $I_1$ at step S16. Furthermore, in the case of "YES" at step S13 and "NO" at step S14, the comparator 34 outputs the luminous intensity signal for setting the LD drive current I to the value $I_2$ at step S17.

Figure 9:
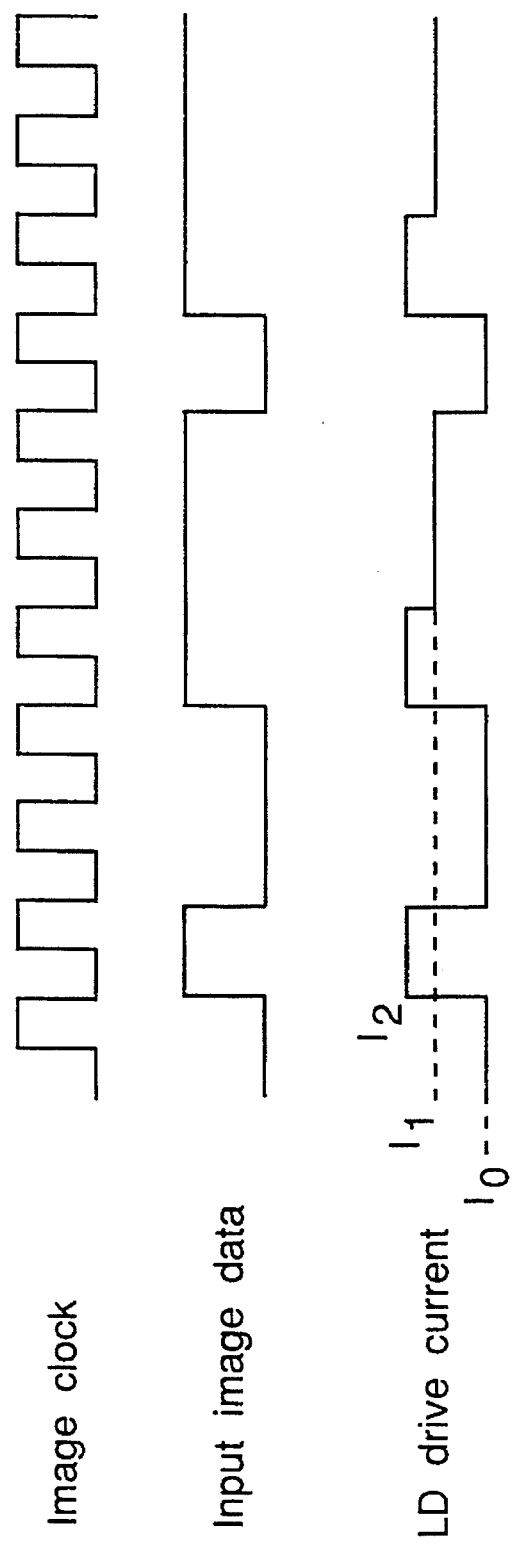
FIG. 9 is a timing chart showing light emitting state of a laser diode operated by the flow chart of FIG. 8.

Then, at step S18, the LD drive circuit 28 effects light emission of the LD 30 on the basis of the luminous intensity signal outputted from the comparator 34. Namely, when the luminous intensity signal for setting the LD drive current I to the value $I_0$ has been outputted, the input image data is in the LOW state as shown in the timing chart of FIG. 9. At this time, light emission of the LD 30 is not performed at all. Meanwhile, when the luminous intensity signal for setting the LD drive current I to the value $I_2$ has been outputted, the input image data is in the HIGH state as shown in FIG. 9. Thus, at this time, full light emission of the LD 30 is performed. Furthermore, when the luminous intensity signal for setting the LD drive current I to the value $I_1$ has been outputted, light emission of the LD 30 is performed at a luminous intensity lower than that for full light emission as shown in FIG. 9. After the above processings have been completed, the current image data D1 is updated to the preceding image data D0 so as to be stored as the preceding image data D0 at step S19. Then, at step S20, the same processings as described above are performed for the next pixel.

Figure 10:
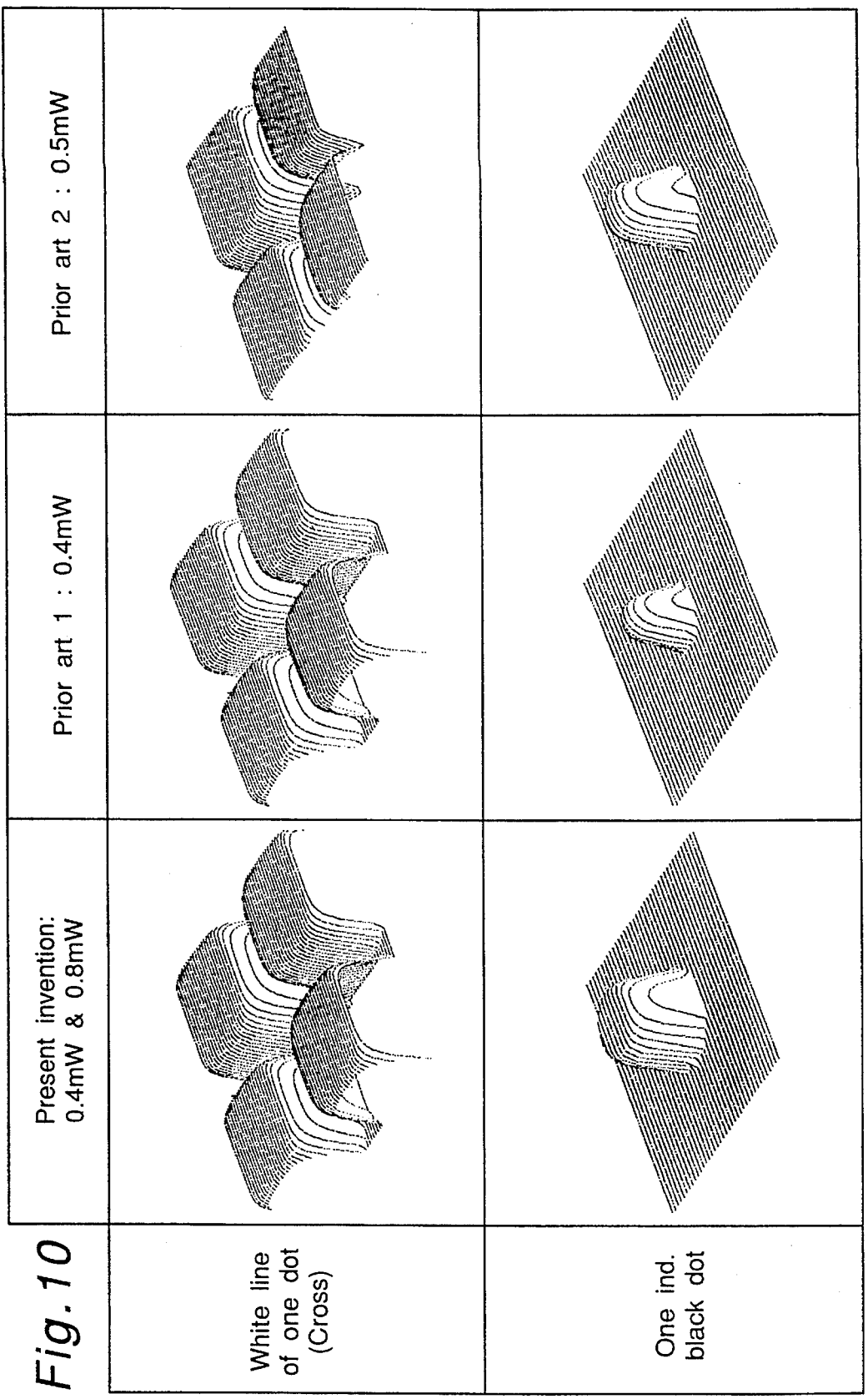
FIG. 10 is a view explanatory of effects of the exposure control devices of FIGS. 1 and 7.

FIG. 10 shows effects of exposure control of the LD 30 by the exposure control devices K1 and K1' of the present invention in comparison with those of first and second prior art exposure control devices. In FIG. 10, distribution of density of images is calculated based on properties of a photosensitive member and a developing device by using a laser beam having the following optical characteristics.

Width of one pixel: 84 μm (300 DPI)

Scanning period of one pixel: 0.3 μsec.

Luminous intensity of laser: 0 at $I_0$

Luminous intensity of laser: 0.4 mW at $I_1$

Luminous intensity of laser: 0.8 mW at $I_2$

Light emission duty of laser: 1

Stationary beam diameter (half width):
    Main scanning: 95 μm
    Auxiliary scanning: 110 μm
    (determined in view of light scattering on outer and inner surfaces of a photosensitive layer and inside the photosensitive layer)

Luminous intensities of lasers of the first and second prior art exposure control devices are, respectively, set to 0.4 mW and 0.5 mW.

In FIG. 10, height of a convex represents density. In case printing pattern is a white line of one dot, it is apparent from FIG. 10 that contrast between black and white is not so clear in the second prior art exposure control device. On the other hand, in the first prior art exposure control device, contrast between black and white is clearer than that of the second prior art exposure control device but reproducibility of one independent black dot is inferior to that of the second prior art exposure control device. Therefore, it is understood that in the first and second prior art exposure control devices, it is difficult to improve reproducibility of not only one white dot but one black dot. On the other hand, it is seen that in the present invention, reproducibility of one white dot as well as one black dot is improved far better than that of the first and second prior art exposure control devices. In the present invention, luminous intensity for reproducing one independent black dot is set to 0.8 mW higher than those of the first and second prior art exposure control devices and luminous intensity for reproducing one independent white dot is set to 0.4 mW equal to that of the first prior art exposure control device in which contrast between black and white is satisfactory for one independent white dot. As a result, in the present invention, it is possible to obtain excellent contrast between black and white for not only one independent black dot but one independent white dot. Consequently, it is understood that it is difficult to print both one white dot and one independent black dot in the first and second prior art exposure control devices, while it is possible to print both one white dot and one independent black dot in the exposure control device of the present invention.

As will be seen from the foregoing description of the exposure control devices K1 and K1' of the present invention, since luminous intensity of the laser beam output means is changed according to whether or not the pixel to be printed is one independent black dot, it becomes possible to print with fidelity both one independent white dot and one independent black dot in response to the given image data.

Figure 11:
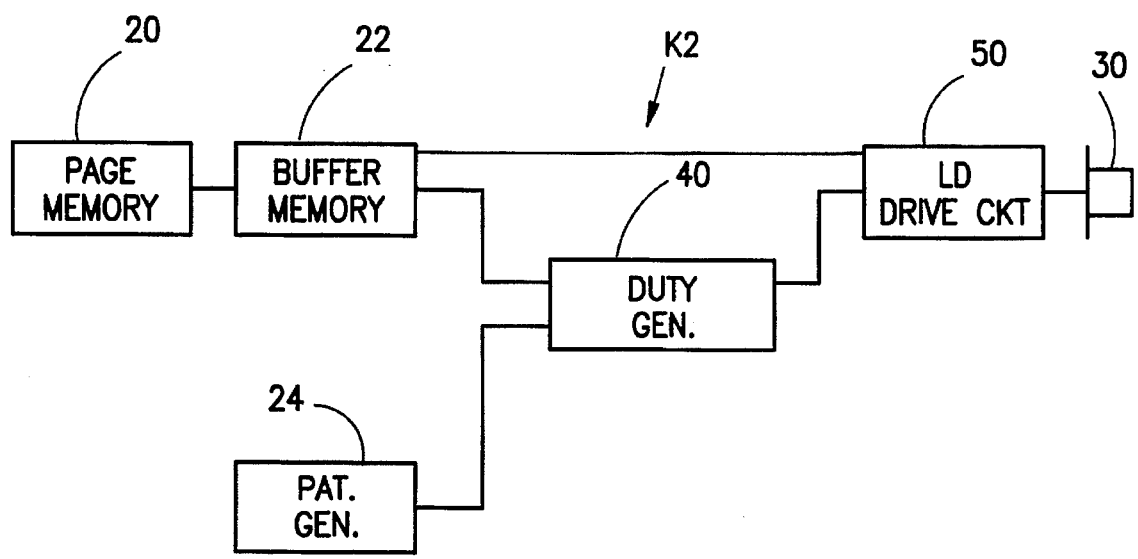
FIG. 11 is a block diagram showing a general construction of an exposure control device according to a second embodiment of the present invention.

FIG. 11 shows an exposure control device K2 according to a second embodiment of the present invention. In the exposure control device K2, the intensity generator 26 and the LD drive circuit 28 of the exposure control device K1 are replaced by a duty generator 40 and an LD drive circuit 50, respectively. The duty generator 40 reads out from the buffer memory 22, image data of a pixel to be printed and data of pixels surrounding the pixel and judges whether or not the read-out data coincides with the predetermined pattern supplied from the pattern generator 24 so as to output, as a light emission control signal, a result of this judgement to the subsequent LD drive circuit 50. The generator 24 and the duty generator 40 function as a detection means.

The LD drive circuit 50 functions as a light emission control means. The image data to be printed is sequentially supplied to the LD drive circuit 50 from the buffer memory 22 and the LD drive circuit 50 performs, based on the image data, on-off control of the LD 30 acting as a laser beam output means. At this time, light emission period (light emission duty) is controlled based on the light emission control signal outputted from the duty generator 40. Since other constructions of the exposure control device K2 are similar to those of the exposure control device K1, the description is abbreviated for the sake of brevity.

Figure 12:
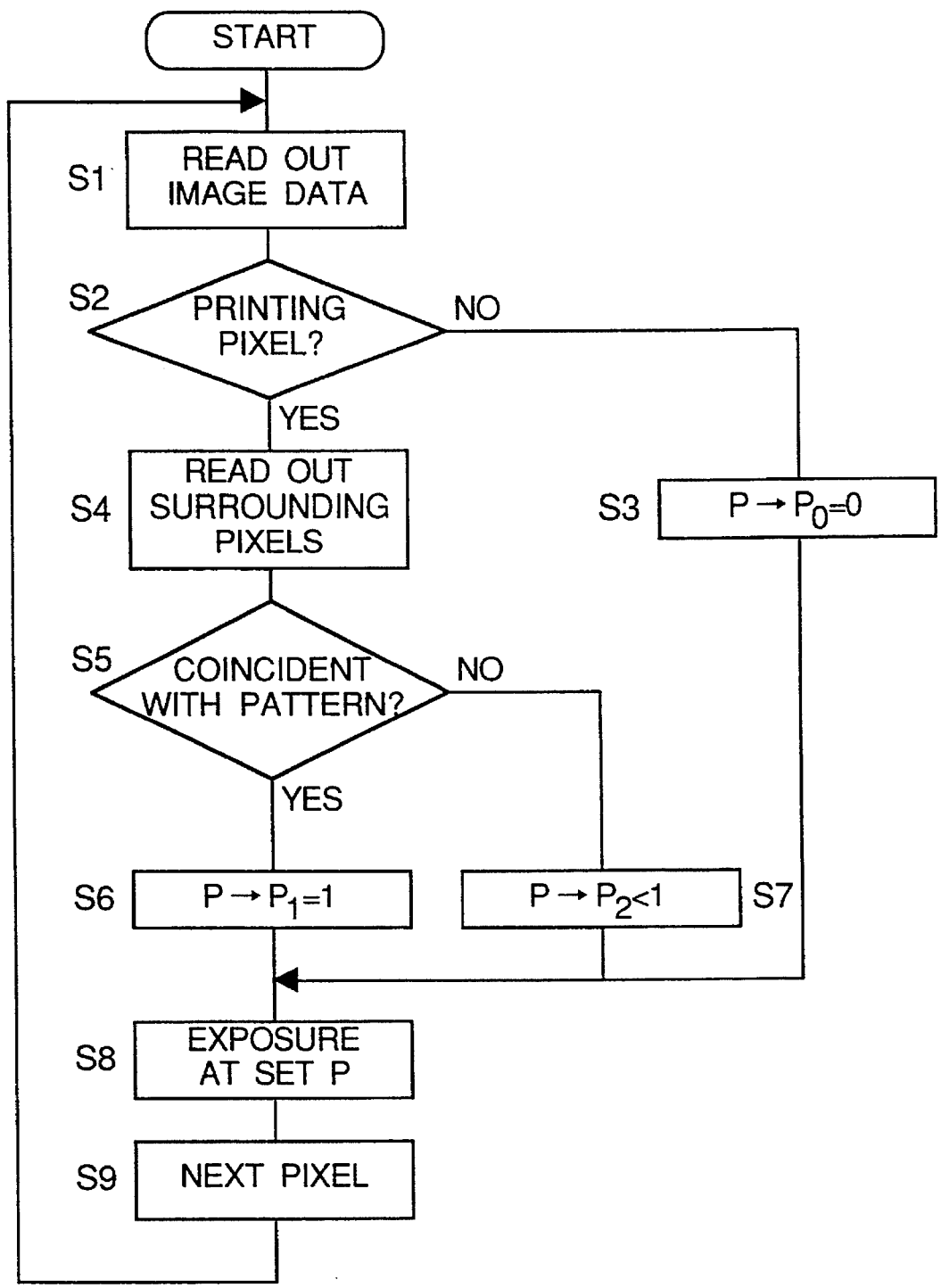
FIG. 12 is a flow chart showing operations of the exposure control device of FIG. 11.

The exposure control device K2 of the above described arrangement is operated as follows in accordance with the flow chart of FIG. 12. The flow chart of FIG. 12 is similar to that of FIG. 4 and only steps S3 and S6 to S8 in FIG. 12 are different from those of FIG. 4. If it is found at step S2 that the read-out image data is nonprinting data, i.e. a nonprinting pixel, a signal for setting a light emission duty ratio P to a value $P_0$ of 0, in other words, a signal for preventing light emission of the LD 30 is outputted as the light emission control signal at step S3.

On the other hand, when the read-out image data is data to be printed, i.e. a printing pixel, the data of the pixels surrounding the pixel is also read out by the duty generator 40 at step S4. Then, at step S5, the duty generator 40 judges whether or not the data of these pixels coincides with the predetermined pattern supplied from the pattern generator 24. In the case of "YES" at step S5, the pixel to be printed is one independent dot and thus, at step S6, the duty generator 40 outputs, as the light emission control signal, a signal for setting the light emission duty ratio P to a value $P_1$ of 1. On the contrary, in the case of "NO" at step S5, the pixel to be printed is not one independent dot and thus, at step S7, the duty generator 40 outputs, as the light emission control signal, a signal for setting the light emission duty ratio P to a predetermined value $P_2$ smaller than 1. Subsequently, at step S8, the LD drive circuit 50 effects light emission of the LD 30 on the basis of the light emission control signal outputted from the duty generator 40.

Figure 13:
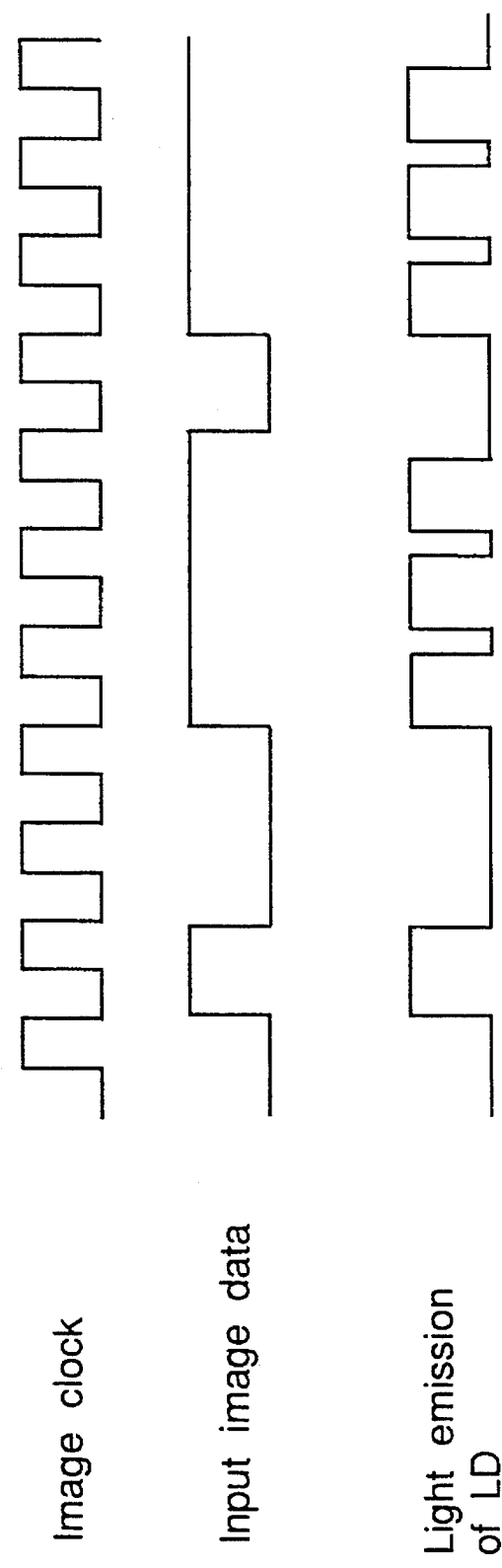
FIG. 13 is a timing chart of light emitting state of a laser diode operated by the flow chart of FIG. 12.

Namely, when the light emission control signal for setting the light emission duty ratio P to the value $P_0$ has been outputted, the input image data is in the LOW state as shown in the timing chart of FIG. 13. At this time, light emission of the LD 30 is not performed at all. Meanwhile, when the light emission control signal for setting the light emission duty ratio P to the value $P_1$ of 1 has been outputted, the input image data is in the HIGH state as shown in FIG. 13. At this time, light emission of the LD 30 is performed during a period corresponding to a width of one pixel. Furthermore, when the light emission control signal for setting the light emission duty ratio P to the value $P_2$ smaller than 1 has been outputted, light emission of the LD 30 is performed during a period shorter than the period corresponding to the width of one pixel as shown in FIG. 13. Thereafter, the same processings as described above are performed for the next pixel at step S9.

Thus, by controlling period of light emission of the LD 30 on the basis of whether or not the pixel to be printed is one independent dot, printed states having fidelity for data can be achieved as shown in FIGS. 6(A) to 6(C). Namely, when the data shown in FIG. 6(A) has been inputted, light emission of the LD 30 is restricted to the period shorter than the period corresponding to the width of one pixel, quantity of leaked light to the neighboring nonprinting area is reduced to a threshold value or less. As a result, the printed state has fidelity for the data as shown in FIG. 6(A). Meanwhile, also when the data includes nonprinting data of one dot as shown in FIG. 6(B), period of light emission of the LD 30 is restrained in the same manner as in FIG. 6(A), so that quantity of leaked light to the nonprinting area of the one independent dot is not more than the threshold value and thus, the printed state has fidelity for the data as shown in FIG. 6(B). Furthermore, when the data includes printing data of one independent dot as shown in FIG. 6(C), light emission of the LD 30 is performed during the period corresponding to the width of one pixel. Hence, quantity of light exceeding the threshold value is obtained at the dot. Therefore, also in case the data includes the printing data of one independent dot, the printed state having fidelity for the data can be obtained.

In this embodiment, setting of the duty ratio for control of light emission is not limited to the one described above. For example, the duty ratio may be set to a plurality of values in accordance with kinds of the recording media in use or such a method may be employed in which the duty ratio set in accordance with the coincident pattern is changed.

Figure 14:
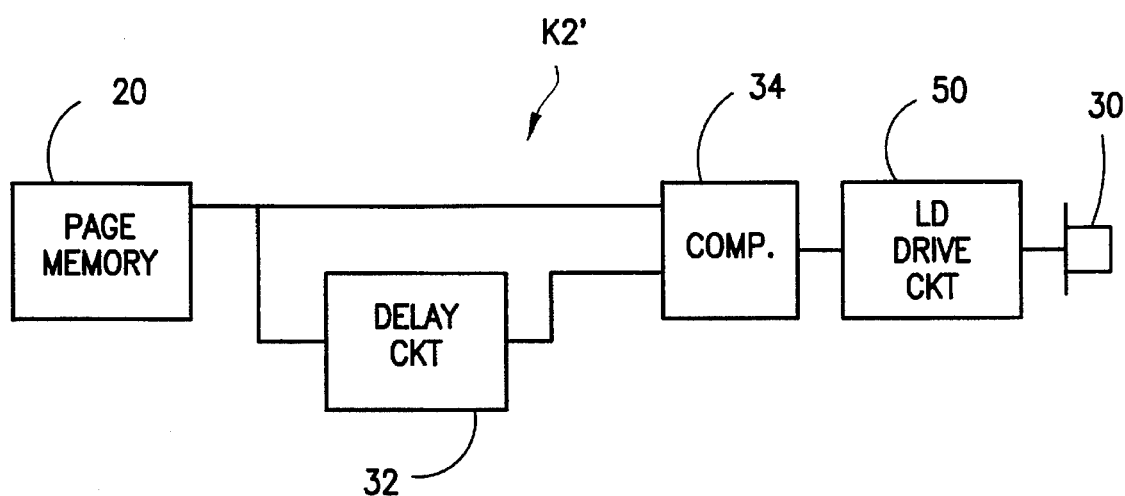
FIG. 14 is a block diagram showing a general construction of an exposure control device which is a modification of the exposure control device of FIG. 11.

FIG. 14 shows an exposure control device K2' which is a modification of the exposure control device K2. The exposure control device K2' is structurally similar to the exposure control device K1' of FIG. 7 and the LD drive circuit 28 of the exposure control device K1' is replaced by the LD drive circuit 50 in the exposure control device K2'. Since other constructions of the exposure control device K2' are similar to those of the exposure control device K1', the description is abbreviated for the sake of brevity. Thus, the exposure control device K2' includes the page memory 20, the delay circuit 32, the comparator 34 and the LD drive circuit 50.

In the above described arrangement of the exposure control device K2', the LD drive circuit 50 is adapted to control period of light emission of the LD 30 in accordance with a comparative result of the comparator 34.

Figure 15:
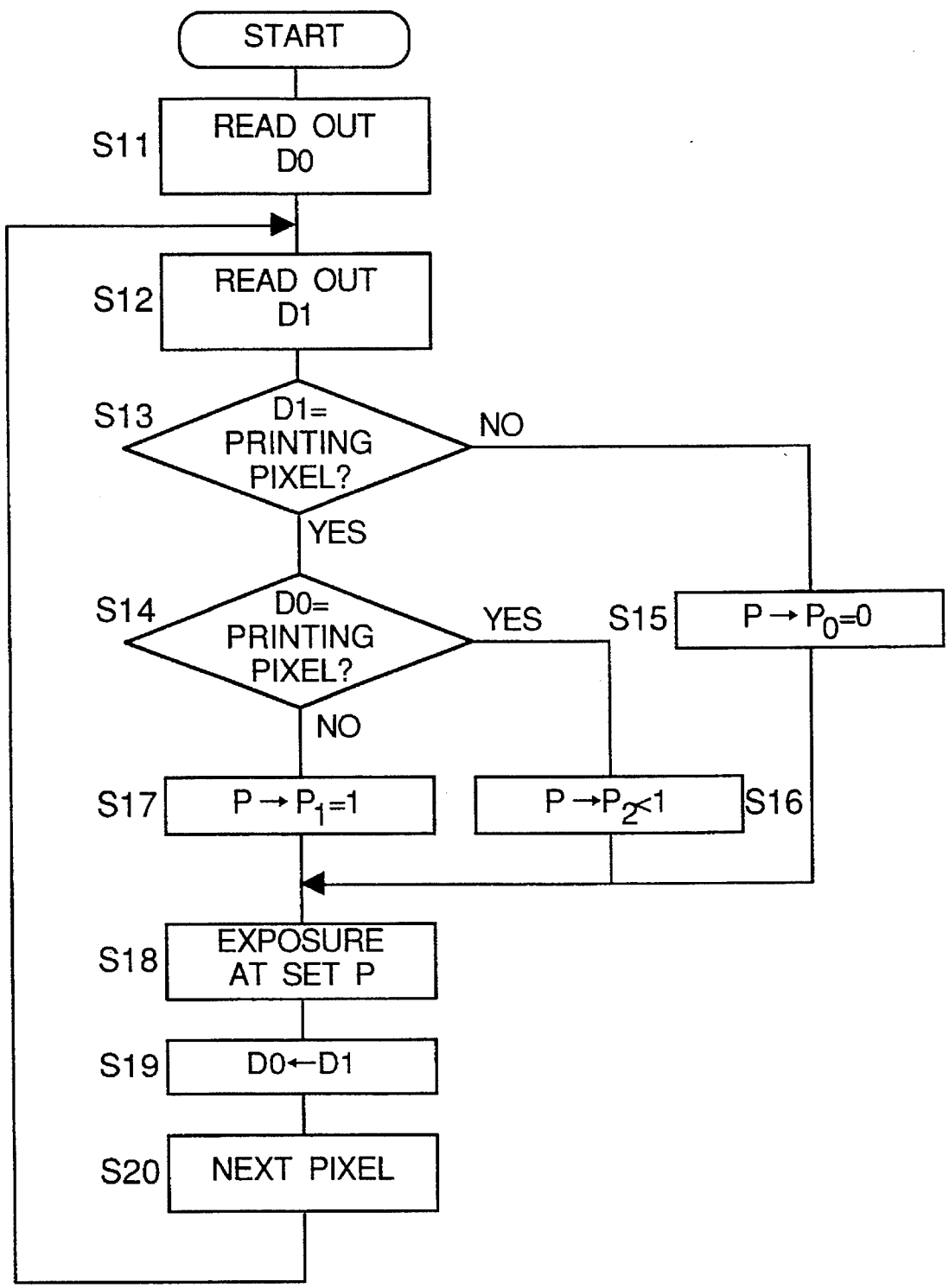
FIG. 15 is a flow chart showing operations of the exposure control device of FIG. 14.

The exposure control device K2' of the above described arrangement is operated based on the flow chart of FIG. 15. The flow chart of FIG. 15 is similar to that of FIG. 8 and only steps S15 to S18 in FIG. 15 are different from those of FIG. 8. If it is found at step S13 that the image data D1 is not a printing pixel, printing is not required to be performed and thus, at step S15, the comparator 34 outputs the light emission control signal for setting the light emission duty ratio P to the value $P_0$ of 0. On the other hand, when both the image data D1 and the image data D0 are printing pixels at steps S13 and S14, namely when the printing pixels are arranged continuously, the comparator 34 outputs the light emission control signal for setting the light emission duty ratio P to the value $P_2$ smaller than 1 at step S16. Furthermore, when the image data D1 is the printing pixel at step S13 but the image data D0 is the nonprinting pixel at step S14, the comparator 34 outputs the light emission control signal for setting the light emission duty ratio P to the value $P_1$ of 1 at step S17.

Figure 16:
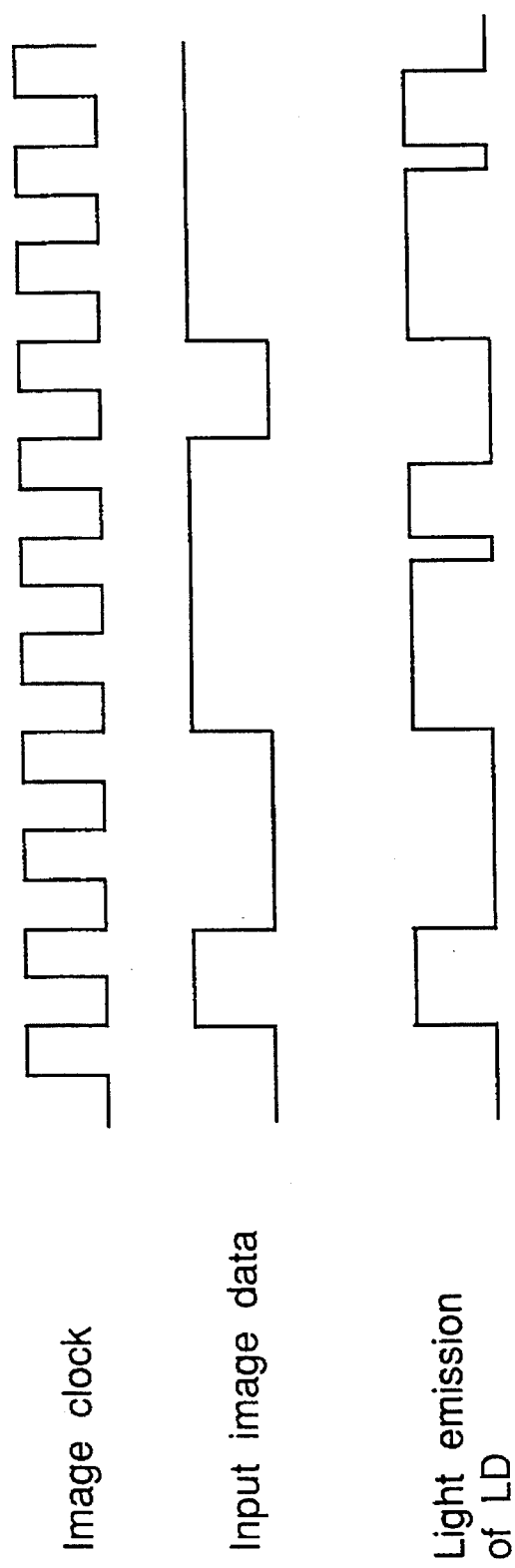
FIG. 16 is a timing chart showing light emitting state of a laser diode operated by the flow chart of FIG. 15.

Then, at step S18, the LD drive circuit 50 effects light emission of the LD 30 on the basis of the light emission control signal outputted from the comparator 34. Namely, when the light emission control signal for setting the light emission duty ratio P to the value $P_0$ of 0 has been outputted, the input image data is in the LOW state as shown in the timing chart of FIG. 16. At this time, light emission of the LD 30 is not performed at all. Meanwhile, when the light emission control signal for setting the light emission duty ratio P to the value $P_1$ of 1 has been outputted, the input image data is in the HIGH state as shown in FIG. 16. Thus, at this time, light emission of the LD 30 is performed during the period corresponding to the width of one pixel. Furthermore, when the light emission control signal for setting the light emission duty ratio P to the value $P_2$ smaller than 1, light emission of the LD 30 is performed during the period shorter than the period corresponding to the width of one pixel as shown in FIG. 16. After the above processings have been completed, the current image data D1 is updated to the preceding image data D0 so as to be stored as the preceding image data D0 at step 19. Then, at step S20, the same processing as described above are performed for the next pixel.

Figure 17:
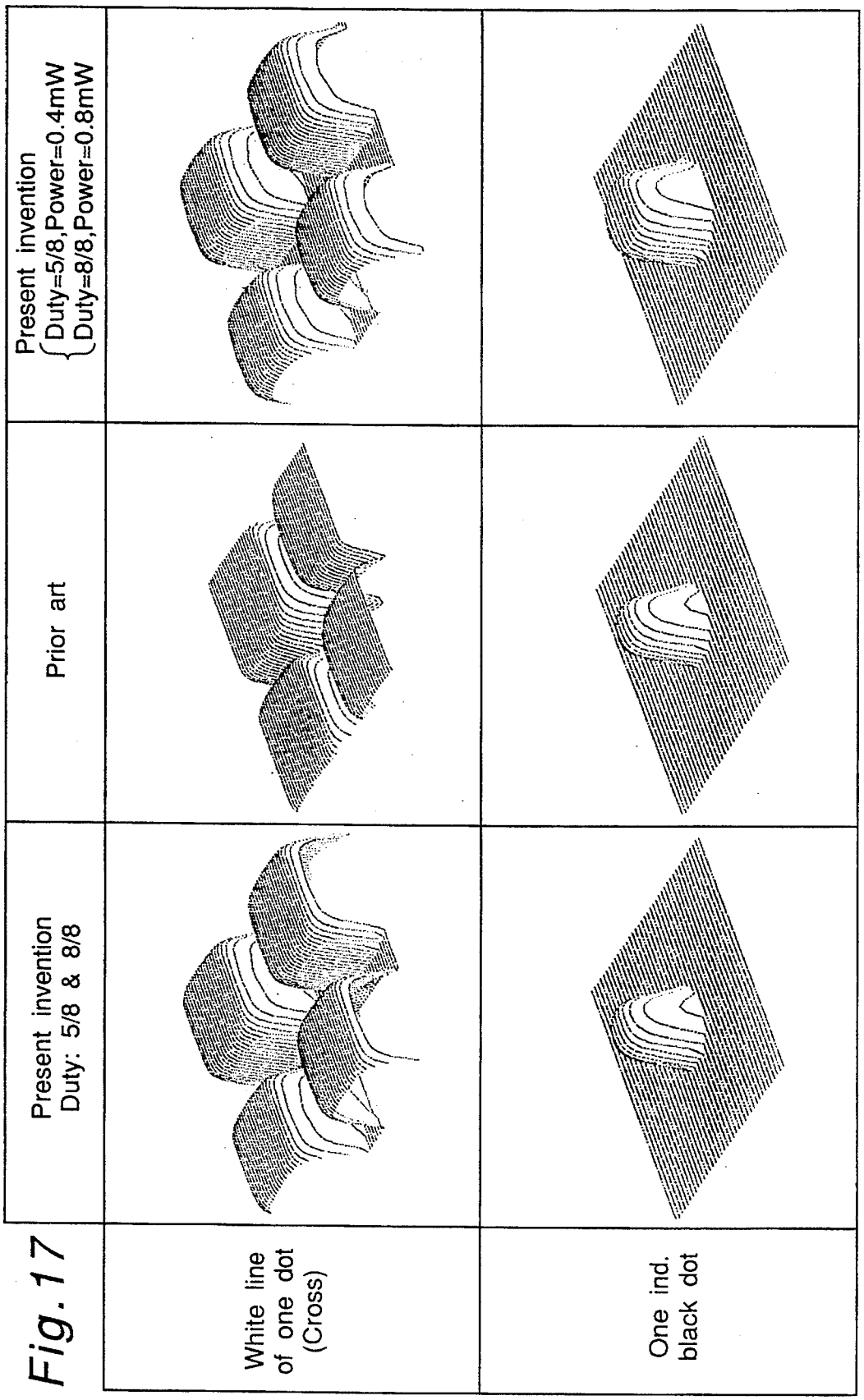
FIG. 17 is a view explanatory of effects of the exposure control devices of FIGS. 11 and 14.
Figure 18:
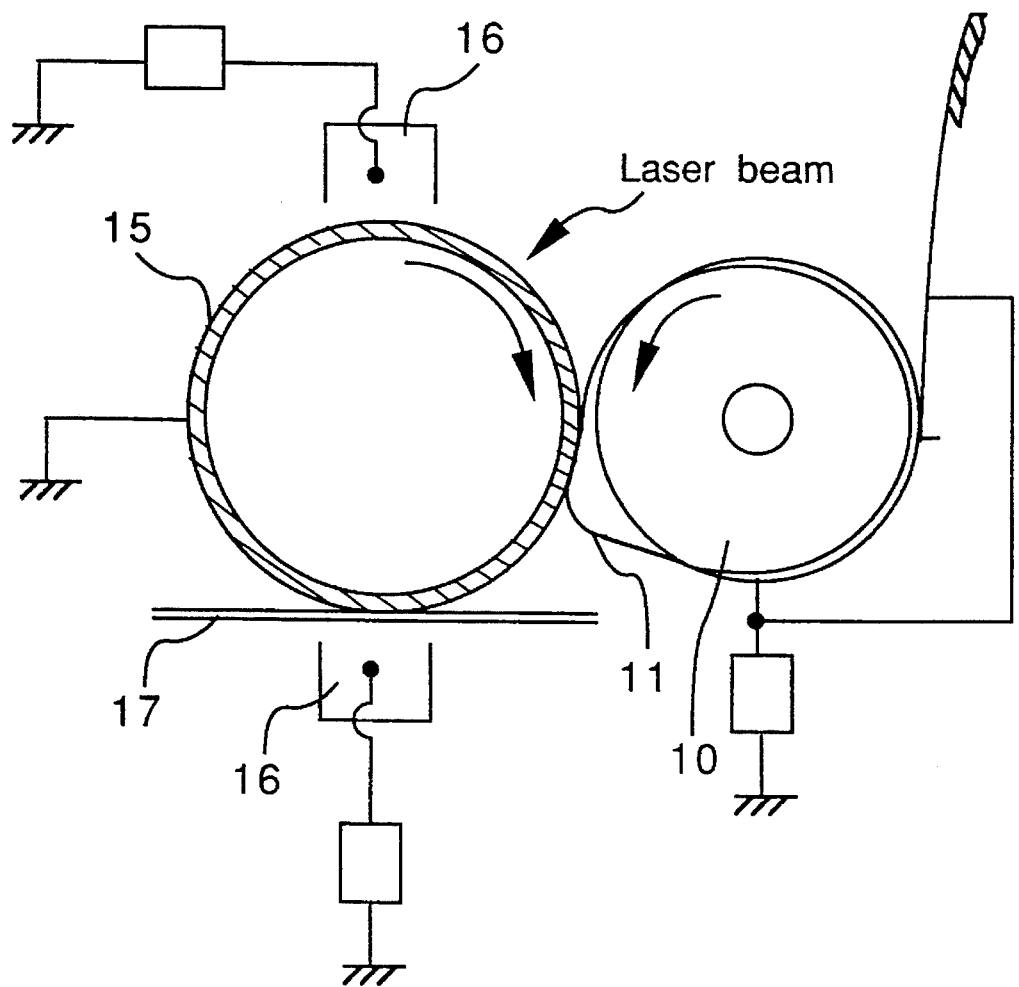
FIG. 18 is a schematic view of a prior art printer in general use (already referred to)
Figure 19:
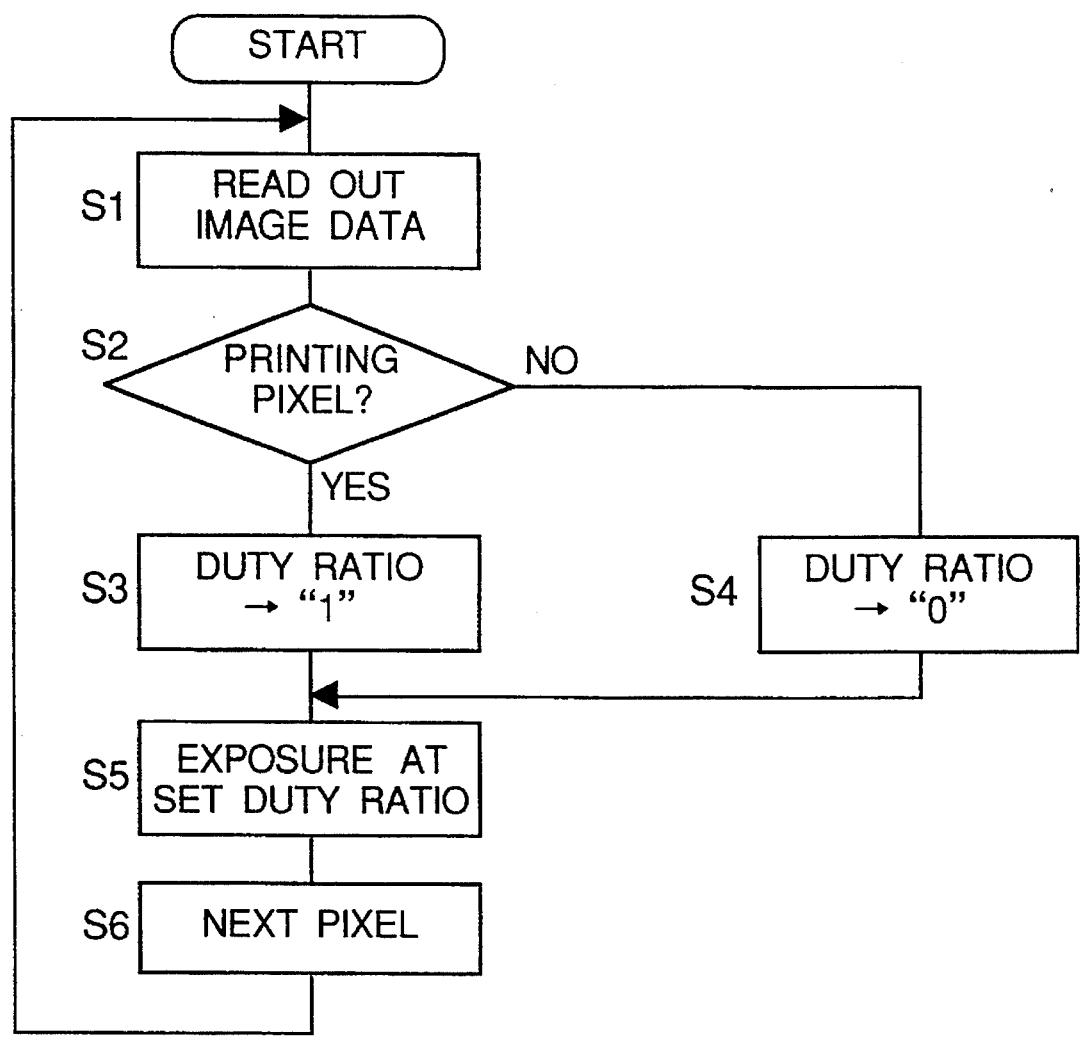
FIG. 19 is a flow chart showing operations of a laser diode of the prior art printer of FIG. 17 (already referred to)
Figure 20:
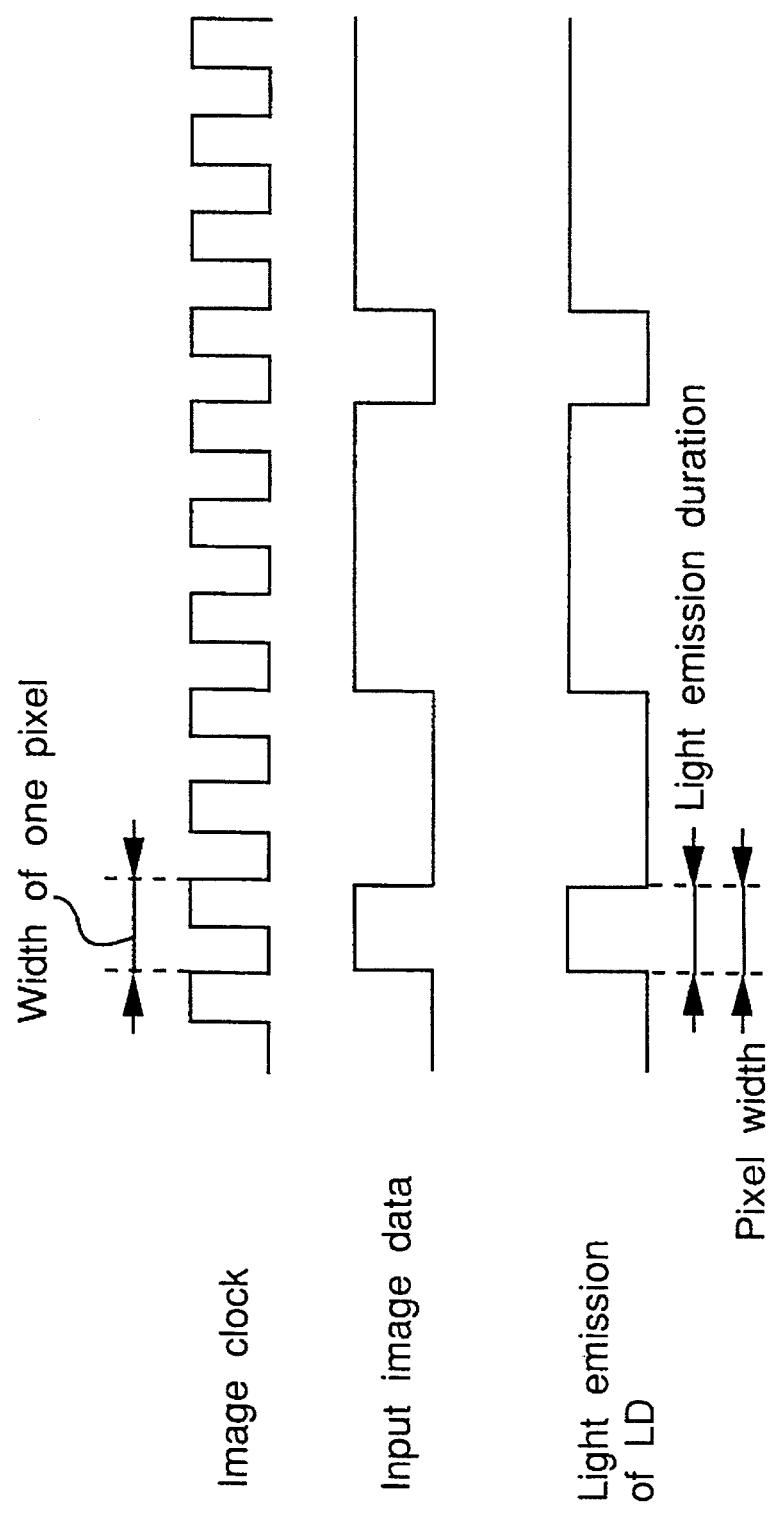
FIG. 20 is a timing chart showing light emitting state of the laser diode of FIG. 19 (already referred to)

FIG. 17 shows effects of control of light emission of the LD 30 by the exposure control devices K2 and K2' in comparison with those of a prior art exposure control device. In FIG. 17, distribution of density of images is calculated based on properties of a photosensitive member and a developing device by using a laser beam having the following optical characteristics.

Width of one pixel: 84 μm (300 DPI)

Scanning period of one pixel: 0.3 μsec.

Light emission duty of laser: 0 at $P_0=0$

Light emission duty of laser: 5/8 at $P_2$ (cont. dots) <1

Light emission duty of laser: 8/8 at $P_1$ (ind. dot)=1 (full light emission)

Luminous intensity of laser: 0.50 mW

Stationary beam diameter (half width):
　Main scanning: 95 μm
　Auxiliary scanning: 110 μm
　(determined in view of light scattering on outer and inner surfaces of a photosensitive layer and inside the photosensitive layer)

In the prior art exposure control device, light emission duty of the laser has only a value of 0 for nonemission of light and a value of 1 for full light emission. In case printing pattern is a white line of one dot, it is apparent from FIG. 17 that contrast between black and white is not so clear in the prior art exposure control device but is improved in the present invention far better than that of the prior art exposure control device. In the case of one independent black dot, both the exposure control device of the present invention and the prior art exposure control device are operated for full light emission of the LD 30 and thus, excellent contrast can be obtained in both the exposure control device of the present invention and the prior art exposure control device. Therefore, it is understood that it is difficult to print both one white dot and one independent black dot in the prior art exposure control device, while it is possible to print both one white dot and one independent black dot in the exposure control device of the present invention.

The right column of FIG. 17 shows one example of the present invention in which not only the light emission duty but the luminous intensity is changed over. More specifically, when the light emission duty is 5/8, the luminous intensity is lowered to 0.4 mW. On the other hand, when the light emission duty is 8/8, the luminous intensity is raised to 0.8 mW. Through this control, clearer contrast can be obtained as shown in FIG. 17.

As is clear from the foregoing description of the exposure control devices K2 and K2' of the present invention, since period of light emission of the laser beam output means is changed according to whether or not the pixel to be printed is one independent black dot, it becomes possible to print with fidelity both one independent white dot and one independent black dot in response to the given image data.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. An image forming apparatus comprising:

a laser beam irradiating means for irradiating a laser beam onto a record support member;

a storage means for storing image data composed of a plurality of dots;

a detection means which reads out the image data from said storage means so as to detect whether or not dots to be subjected to light emission by the laser beam are arranged continuously; and a control means for controlling an irradiation period of said laser beam irradiating means corresponding to one dot to a second irradiation period of said later beam irradiating means when said detection means detects that the dots to be subjected to light emission are arranged continuously, the second irradiating period being shorter than the first irradiation period.

2. An image forming apparatus as claimed in claim 1, wherein said detection means includes a delay circuit for outputting delayed image data obtained by imparting a delay of one dot to the image data read out from said storage means and judges whether or not both the image data read out from said storage means and the delayed image data outputted from said delay circuit are dots to be subjected to light emission.

3. An image forming apparatus as claimed in claim 1, wherein said detection means includes a pattern generator for outputting a pattern of further dots surrounding the dots to be subjected to light emission indicating that the dots to be subjected to light emission are independent and a read-out means for reading out image data of the further dots from said storage means and comparing the pattern outputted from said pattern generator with the image data read out by said read-out means.

4. An image forming apparatus as claimed in claim 1, wherein said detection means includes a pattern generator for outputting a pattern of further dots surrounding the dots to be subjected to light emission indicating that the dots to be subjected to light emission are arranged continuously and a read-out means for reading out image data of the further dots from said storage means and comparing the pattern outputted from said pattern generator with the image data read out by said read-out means.

5. An image forming apparatus comprising:

a laser beam irradiating means for irradiating a laser beam onto a record support member;

a storage means for storing image dam composed of a plurality of dots;

a delay circuit which outputs delayed image data obtained by imparting a delay of one dot to the image data read out from said storage means;

a decision means for deciding whether dots to be subjected to light emission by the laser beam are arranged independently or continuously on the basis of the image data read out from said storage means and the delayed image data outputted from said delayed circuit; and a control means for controlling luminous intensity of said laser beam irradiating means in accordance with a decision of said decision means.

6. An image forming apparatus as claimed in claim 5, wherein said control means increases the luminous intensity of said laser beam irradiating means when said decision means decides that the dots to be subjected to light emission by the laser beam are independent.

7. An image forming apparatus as claimed in claim 5, wherein said control means reduces the luminous intensity of said laser beam irradiating means when said decision means decides that the dots to be subjected to light emission by the laser beam are arranged continuously.

8. An image forming apparatus comprising:

a laser beam irradiating means for irradiating a laser beam onto a photosensitive member;

a storage means for storing image data;

a judging means for judging whether or not a dot subjected to light emission by the laser beam is continuous with other dots in said storage means; and a control means for changing a first irradiation period of said laser beam irradiating means corresponding to one dot to a second irradiation period of said laser beam irradiating means smaller than the first irradiation period when said judging means judges that the dot is continuous with other dots.

* * * * *